United States Patent
Kantarjiev et al.

(10) Patent No.: US 7,610,145 B2
(45) Date of Patent: Oct. 27, 2009

(54) SYSTEM AND METHOD FOR DETERMINING RECOMMENDED DEPARTURE TIME

(75) Inventors: Christopher Kantarjiev, Palo Alto, CA (US); Jonathan Hubbard, San Francisco, CA (US); Jonathan Tash, Tucson, AZ (US)

(73) Assignee: Triangle Software LLC, Santa Clara, CA (US)

( * ) Notice: Subject to any disclaimer, the term of this patent is extended or adjusted under 35 U.S.C. 154(b) by 736 days.

(21) Appl. No.: 10/897,550

(22) Filed: Jul. 23, 2004

(65) Prior Publication Data

US 2005/0021225 A1 Jan. 27, 2005

Related U.S. Application Data

(60) Provisional application No. 60/490,199, filed on Jul. 25, 2003.

(51) Int. Cl.
 *G08G 1/00* (2006.01)
(52) U.S. Cl. .......................... 701/204; 701/119
(58) Field of Classification Search ......... 701/200–202, 701/23–25, 117–119, 204; 340/988, 994, 340/995.13; 348/148–149
See application file for complete search history.

(56) References Cited

U.S. PATENT DOCUMENTS

| | | | |
|---|---|---|---|
| 5,428,545 A | 6/1995 | Maegawa et al. | |
| 5,465,079 A | 11/1995 | Bouchard et al. | |
| 5,485,161 A | 1/1996 | Vaughn | |
| 5,499,182 A | 3/1996 | Ousborne | |
| 5,539,645 A | 7/1996 | Mandhyan et al. | |
| 5,822,712 A * | 10/1998 | Olsson | 701/117 |
| 5,867,110 A | 2/1999 | Naito et al. | |
| 5,908,464 A | 6/1999 | Kishigami et al. | |
| 5,911,773 A | 6/1999 | Mutsuga et al. | |
| 5,931,888 A | 8/1999 | Hiyokawa | |
| 6,009,374 A | 12/1999 | Urahashi | |
| 6,064,970 A | 5/2000 | McMillan et al. | |
| 6,150,961 A | 11/2000 | Alewine et al. | |
| 6,236,933 B1 | 5/2001 | Lang | |
| 6,256,577 B1 * | 7/2001 | Graunke | 701/117 |
| 6,282,486 B1 | 8/2001 | Bates et al. | |
| 6,295,492 B1 | 9/2001 | Lang et al. | |
| 6,317,686 B1 * | 11/2001 | Ran | 701/210 |
| 6,353,795 B1 | 3/2002 | Ranjan | |
| 6,466,862 B1 | 10/2002 | DeKock et al. | |
| 6,473,000 B1 | 10/2002 | Secreet et al. | |

(Continued)

FOREIGN PATENT DOCUMENTS

WO  WO98/23018  5/1998

(Continued)

OTHER PUBLICATIONS

Rockwell, Mark, "Telematics Speed Zone Ahead," Wireless Week, Jun. 15, 2004, Reed Business Information, http://www.wirelessweek.com.

*Primary Examiner*—Yonel Beaulieu
(74) *Attorney, Agent, or Firm*—Carr & Farrell LLP

(57) ABSTRACT

The present invention provides a system and method for determining the necessary departure time to allow for an on-time or desired arrival time at a particular location over a particular route based on the evaluation of historic, present, and predicted road conditions.

24 Claims, 8 Drawing Sheets

U.S. PATENT DOCUMENTS

| | | |
|---|---|---|
| 6,556,905 B1 | 4/2003 | Mittelsteadt et al. |
| 6,574,548 B2 | 6/2003 | DeKock et al. |
| 6,584,400 B2 | 6/2003 | Beardsworth |
| 6,594,576 B2 | 7/2003 | Fan et al. |
| 6,675,085 B2 | 1/2004 | Straub |
| 6,720,889 B2 | 4/2004 | Yamaki et al. |
| 6,728,605 B2 | 4/2004 | Lash et al. |
| 6,785,606 B2 | 8/2004 | DeKock et al. |
| 6,914,541 B1 | 7/2005 | Zierden |
| 6,922,629 B2 * | 7/2005 | Yoshikawa et al. .......... 701/117 |
| 6,931,309 B2 | 8/2005 | Phelan et al. |
| 6,987,964 B2 | 1/2006 | Obradovich et al. |
| 7,010,583 B1 * | 3/2006 | Aizono et al. ............... 709/219 |
| 2001/0018628 A1 | 8/2001 | Jenkins et al. |
| 2003/0135304 A1 | 7/2003 | Sroub et al. |

FOREIGN PATENT DOCUMENTS

| | | |
|---|---|---|
| WO | WO 01/88480 | 11/2001 |

* cited by examiner

SYSTEM AND METHOD FOR DETERMINING RECOMMENDED DEPARTURE TIME

CROSS-REFERENCE TO RELATED APPLICATIONS

The present application claims the priority benefit of U.S. Provisional Patent Application No. 60/490,199 filed Jul. 25, 2003 and entitled "System and Method for Determining and Sending Recommended Departure Times Based on Predicted Traffic Conditions to Road Travelers." This application is related to U.S. Provisional Patent Application No. 60/471,021 filed May 15, 2003 and entitled "Method and System for Evaluating Performance of a Vehicle and/or Operator" and U.S. patent application Ser. No. 10/845,630 filed May 13, 2004 and entitled "System and Method for Evaluating Vehicle and Operator Performance." The disclosures of the above-referenced and commonly owned applications are hereby incorporated by reference.

BACKGROUND OF THE INVENTION

1. Field of the Invention

The present invention relates to the field of time-management for road travelers and vehicles, and more particularly, to determining departure times to allow for on-time arrivals at particular locations based on evaluation of historic, present, and predicted road conditions.

2. Description of Related Art

Recent studies have found that road travelers can spend almost 50% of their commute time 'stuck' in traffic, that is, not making significant progress on traversing a total distance to their final destination. This unfortunate phenomenon is sometimes referred to as 'grid lock.' Grid lock is often exacerbated, if not caused by, road construction, high traffic volume related to 'rush hour,' or otherwise resulting from special events such as concerts and holiday traffic or, as is most often the case, accidents on a roadway resulting in road or lane closures.

Further studies have demonstrated that daily commuters account for over 75% of all car trips. With increasing urban-sprawl, most road travelers are commuters with increasingly significant distances to travel. Combined with the fact that almost 90% of daily commuters in the United States, for example, use private vehicles and therein represent millions of people wanting to move at the same time, road systems in the United States and around the world simply do not have the capacity to handle peak loads of traffic. Traffic congestion has become, unfortunately, a way of life.

Road travelers are, as a result, often vulnerable when making travel plans in that they do not know what to expect in terms of traffic conditions or commute time on any given day. Poor and inconsistent traffic information combined with the road traveler's general inability to process multiple feeds of incoming real time and historical data as it relates to weather, incident reports, time of year, construction road closures, and special events further complicate these problems.

Road travelers are reduced to making inaccurate predictions as to required travel time necessary to traverse from a point of departure to a desired point of arrival. Furthermore, road travelers, due in part to constantly changing weather and traffic conditions, are often unaware that more optimal travel routes might exist both prior to departure and while en route to the desired point of arrival.

Present systems inform the road traveler of actual conditions on a variety of routes, but leave determination of an ultimate travel route and necessary departure time to the road traveler, which inevitably results in the aforementioned inaccurate predictions.

For example, U.S. Pat. No. 6,594,576 to Fan et al. provides a traffic data compilation computer that determines present traffic conditions and a fastest route to a particular location under the aforementioned traffic conditions. Fan et al. also provides estimated travel time based on current traffic conditions. Fan et al. fails, however, to provide a necessary departure time to the road traveler so that they may achieve an on-time arrival. Fan et al. also fails to consider historical traffic data in that present conditions may allow for a given travel time but fails to predict a change in that travel time due to a known forthcoming event such as rush hour or a concert. Furthermore, Fan et al. requires the presence of a collection of data from mobile units-vehicles. Absent large scale cooperation of road travelers to equip their vehicles with such data collection equipment, the data collection network of Fan et al. might also produce inaccurate or, at least, incomplete information.

U.S. Pat. No. 6,236,933 to Lang is also representative of the lack of a means to inform road travelers of both evolving road conditions, travel routes, and the necessary departure time on any one of those routes in order to achieve on-time arrival. Lang, too, is dependent upon widespread installation of monitoring electronic devices in each road traveler's vehicle.

There is the need for a system that aggregates multiple sources of traffic data and interprets that traffic data to express it as a predictive road speed and not a static route devoid of considerations of constantly evolving traffic conditions. By overlaying predictive road speeds with a road traveler's starting locating, destination, desired arrival time and other optional attributes, a road traveler is offered a much needed system that determines an optimal route and recommended departure time. Such a system would then deliver the information via a desired message delivery method. Such a system should also remain sensitive of privacy concerns of road travelers in that the presence of a monitoring device might be considered invasive and otherwise outweighs any benefits it might offer in providing predictive road speed.

SUMMARY OF THE INVENTION

The present invention is directed towards a system and method for aggregating and interpreting multiple sources of traffic data. The present invention expresses that data as a predictive road speed for particular sections of road. By determining predictive road speed, the present invention determines the optimal travel route and recommended departure time based on, among other things, destination, and arrival time and changing traffic conditions. The present invention also provides for communication of the optimal departure time to the traveler.

In one embodiment, the road traveler inputs a starting location, a destination, a desired arrival time, and other optional attributes such as maximum desired speed and vehicle type, which may be used by a routing application to calculate a route. The road traveler also inputs information regarding a desired message delivery method such as electronic mail, SMS, telephone, instant message or other message delivery protocol. Using a database of predictive road speeds and a routing engine, the system determines the optimal route and recommended departure time for the road traveler's pre-selected arrival time. The system then delivers this information to the road traveler through the desired message delivery protocol.

Prior to departure, the system continues to re-evaluate the suggested route and estimated travel time using constantly updating road speed forecasts, and delivers alerts to the road traveler when there is a significant change in the recommended route or forecast. A departure and route alert is also sent when the recommended departure time is reached. Updates may also be sent after the departure time to update the road traveler as to changes in the predicted arrival time or recommended route.

By aggregating multiple sources of data, that data can then be interpreted as a predictive road speed. When the predictive speed is overlaid with a road traveler's attributes, the optimal route and departure time along with real-time updates can be delivered to a road traveler. The availability of such information can significantly reduce commute time, especially time spent in traffic, thereby resulting in increased on-time arrival and an overall reduction of stress on transportation infrastructure.

The benefits of the present system include availability of scheduled and, as necessary, up-to-the-minute/emergency departure notifications. The present system is also beneficial in that it provides data for a desired route, as opposed to a variety of routes which forces the user to make inaccurate and often erroneous calculations by combining disparate data.

The present system provides further benefits in that incident reports, weather and time of year are used in backward-looking algorithms to determine new variables that perturb otherwise stable traffic patterns.

DESCRIPTION OF AN EXEMPLARY EMBODIMENT

In accordance with one embodiment of the present invention, a system sends departure notifications to road travelers as to an optimal departure time for a pre-selected travel path to allow for an on-time arrival. This notification takes into account road speed forecasts for the pre-selected travel path and provides updated departure recommendations based on changing traffic conditions. The system aggregates road and other travel data in various forms and formats and expresses it in an average speed for a section or sections of roadway. By overlaying predictive road speeds, for, example with a road traveler's starting location, destination, desired speed, and arrival time, the system evaluates a suggested route and delivers notification to the road traveler as to recommended departure time and route.

Figure 1:
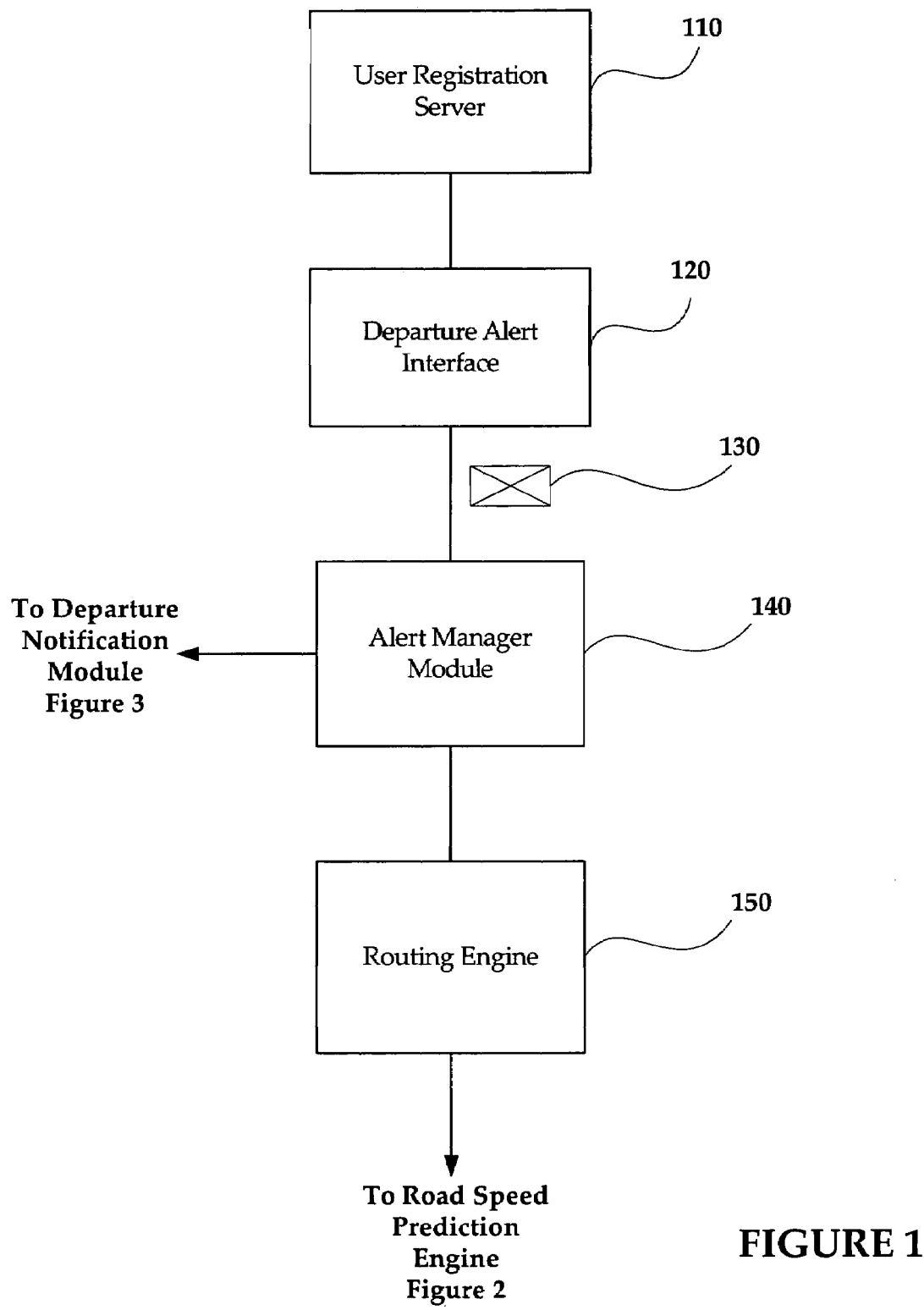
FIG. 1 shows a system for generation of a departure alert.

FIG. 1 illustrates a portion of an exemplary system (FIG. 8) for calculating departure notices whereby a road traveler or a user logs in to the system through, at least, a user registration server 110. The term "user," as used throughout the specification, should be understood to cover a person actually using or interfacing the system (a user, in the truest sense) in addition to a person who might be receiving information from the system while traveling in a vehicle (a road traveler).

In particular, FIG. 1 illustrates with greater particularity that part of a larger system for generating a departure alert 130 whereby a user logs in to the system through, at least, a user registration server 110. The user registration server 110 manages, at least, user identification and authentication but can also manage related processes such as subscriptions and billing. User registration server 110 may contain a database for maintaining, for example, user identification information. At the very least, however, user registration server 110 has means to access, for example, a separate database storing this type of information. The user registration server 110 may also manage commonly used information about a particular user including regularly traveled routes, a preferred notification method, credit card information, and so forth.

The user registration server 110 may also be integrated with architecture of third-party service providers (not shown) such as Internet portals, cellular telephone services, and wireless handheld devices. Such integration allows the present system to deliver departure alerts 130 and notifications 320 through third-party proprietary networks or communication systems, such as instant messaging networks operated AOL®, Yahoo!® and Microsoft®, in addition to providing a value-added resale benefit to be offered by such third-party providers. Departure alerts 130 and departure notifications 320 generated by the present system and integrated with architecture of a third-party can also be charged to a user's third-party service bill (e.g., a wireless telephone bill), and the operator of the present system shares a portion of the third-party service provider's revenue.

Departure alerts 130 and departure notifications 320 generated by the present system can also be charged and/or billed to the user directly by the operator of the system instead of through or by a third-party. For example, a credit card registered and saved to an account by the user can be charged every time a departure alert 130 or a departure notification 320 is generated. Various alternative means of payment and billing exist including pre-purchasing a specific number of departure alerts 130 or departure notifications 320.

The user registration server 110, in some embodiments of the present invention, may be optional. In embodiments omitting the user registration server 110, anonymous users can access the system but risk the loss of certain functionalities. Examples of such a loss of functionality are evidenced in there being no extended retention of personal driving or travel preferences or account information as is explained in detail below.

The user registration server 110 accepts information from a user, which may include a 'user name' or other means of identifying the user, in addition to a 'password' or some other form of security verification information whereby the user registration server 110 may verify if the user is who they contend to be. For example, a user might provide a user name and password combination of 'johndoe' and 'abc123.' The user registration server 110 will then access the database or other means of storing this information to verify if a user identifying him self as 'johndoe' is, in fact, authorized to access the present system via a prior account registration or generation. If so, 'johndoe' is authorized, the user registration server 110 further verifies whether the present user is, in fact, 'johndoe' by verifying whether the password immediately provided (e.g., 'abc123') is the same password as that provided during a registration or initial account generation process as evidencing a right or permission to access the present system account.

Access to the user registration server 110 to verify account access permissions or to otherwise provide, edit, or delete certain information may occur via any number of different interfaces. For example, if the user registration server 110 is integrated with third-party architecture such as Yahoo!®, interface with the user registration server 110 may occur through a third-party web-based user interface specifically generated and designed by Yahoo!®. Similarly, a party directly implementing the present system can generate their own user interface for accessing the user registration server 110. This interface may offer opportunities for co-branding, strategically placed advertisements, or basic account access (e.g., a simple request for a user name and password). The user interface for the user registration server 110 is limited only in that it need be capable of accessing the user registration server 110 and directing the request, storage, or manipulation of information managed by the user registration server 110.

Figure 7:
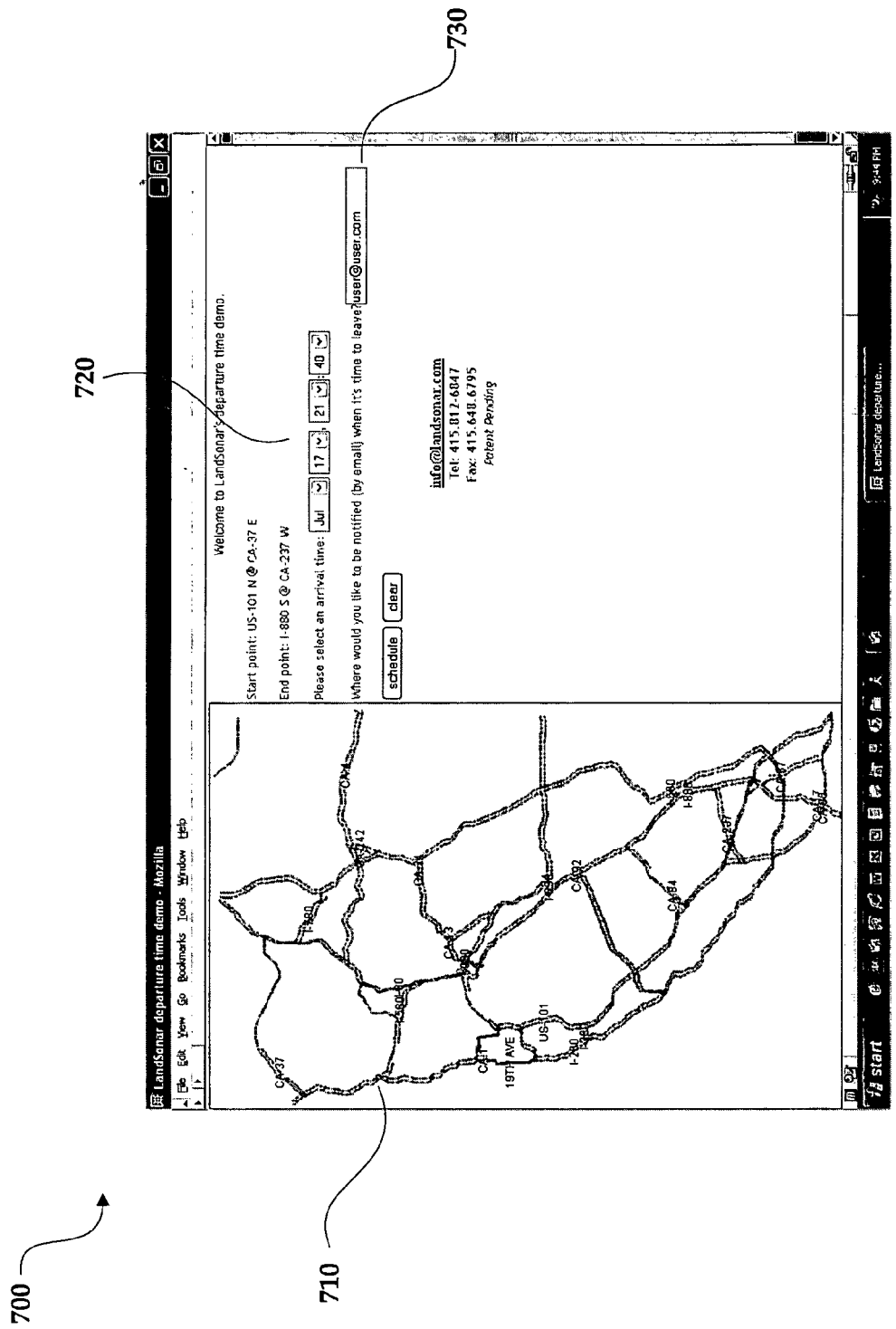
FIG. 7 shows an exemplary departure alert interface for generating a departure alert.

After authenticating the account with the user registration server 110, the user, through a departure alert interface 120, which may include a web site or other form of interface for interacting with an alert manager module 140, creates the departure alert 130. An exemplary embodiment of the departure alert interface 120 is shown in FIG. 7.

The departure alert 130 is created by providing certain attributes, such as information concerning starting point, destination, desired arrival time, routing restrictions, preferred notification method and format, and departure buffer time whereby the user may compensate for such time consuming tasks as packing a briefcase, leaving a parking garage or finding a parking spot and the user's destination. The attributes may also include any other information available to the user that might otherwise aid in calculation of a desired route, such as avoidance of construction zones or directing travel in areas offering a variety of hotels, rest stops, or restaurants. In one embodiment, the attributes and information may be entered in response to specific enumerated queries made through the departure alert interface 120 (e.g., 'What time do you wish to arrive?' or 'What is your maximum desired speed limit?'). In an alternative embodiment, attributes may be generated in response to a graphic query whereby a map is provided and the user 'clicks' on a desired starting or departure point and 'checks off' certain travel attributes (e.g., '☑ avoid construction zones,' '☐ avoid highways with carpool lanes' or '☑ map route near hotels').

Some embodiments of the present invention might offer specific queries that are combined with advertising and branding opportunities. For example, instead of a query to the user that merely asks whether or not the user wishes to travel near hotels or restaurants, a query could be generated whereby the user is asked if they wish to travel near a particular brand of hotels or restaurants.

Figure 2:
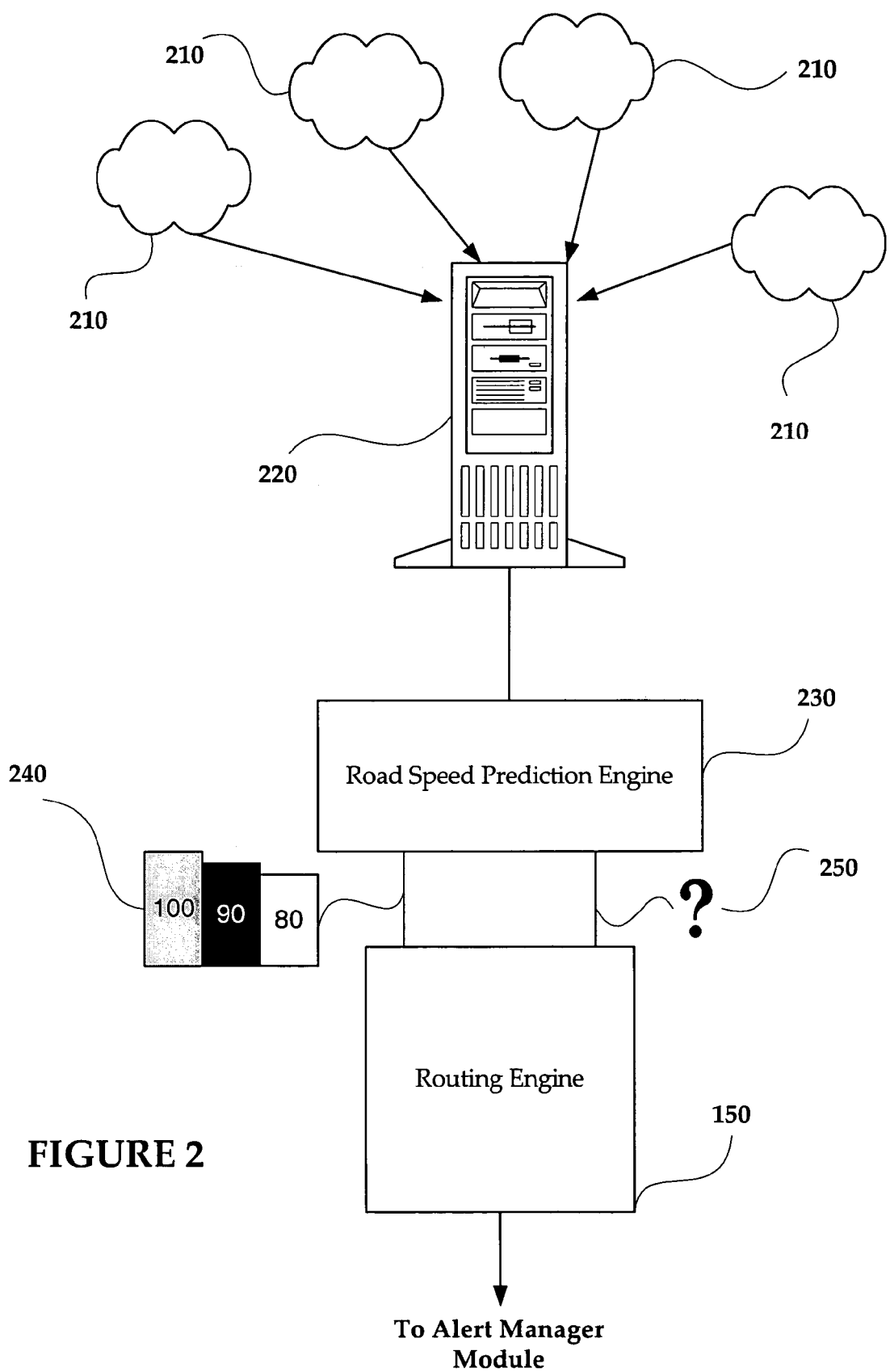
FIG. 2 shows the input and aggregation of traffic data by the system and its processing by a road speed prediction engine that interacts with the routing engine.

The attributes and information provided in the departure alert 130 are then processed by an alert manager module 140 which manages all departure alerts 130 in the system (FIG. 8) and prioritizes the departure alerts 130 for a routing engine 150 (FIG. 2). The alert manager module 140 may be embodied in software (e.g., a computer program) or hardware (e.g., an ASIC), and can be integrated into other elements of the present system. For example, the alert manager module 140 and the routing engine 150 can both be embodied in a single server. Alternatively, and again by way of example, the alert manager module 140 and the routing engine 150—and various other elements of the present system-can be embodied in independent operating structures such as a redundant array of independent disks (RAID) or on different points in a Local Area Network (LAN). So long as various elements of the present system are able to interact with one another and exchange data as is necessary, a singular housing should not be imposed as a limitation on the system.

Referring now to FIG. 2, when the departure alert 130 (FIG. 1) is generated through the departure alert interface 120 (FIG. 1), a preliminary route is created by the routing engine 150 that shows a quickest route between the departure location and destination based on current conditions as determined by a road speed prediction engine 230. A graphic representation of the preliminary route, turn-by-turn driving instructions, estimated drive time, and initial recommended departure time—that is, the date and time (e.g., hour and minute) at which a user should depart their starting destination in order to arrive 'on-time' at their final destination—are presented to the user through the departure alert interface 120 for approval.

The graphic representation, driving instructions, drive time, and departure time are generated by the routing engine 150 as derived from information provided by the road speed prediction engine 230.

From the time of approval of the preliminary route by the user through the departure alert interface 120 and until the destination is reached, the alert manager module 140 regularly queries the routing engine 150 to reassess viability of the preliminary route approved by the user to allow for an on-time arrival using updated data and information processed by the road speed prediction engine 230. For example, the road speed prediction engine 230 may process new real-time traffic data in conjunction with historically observed road speeds or the occurrence of a special event or incident to generate new short-term and long-term predictions of average road speed (collectively referred to as a prediction of average speed 240, that is, a prediction of speed for a particular segment or segments of roadway for a particular date and/or time based on available and predicted or extrapolated data).

The routing engine 150, either independently or in response to a prompt by, for example, the alert manager module 140 or the user directly, will make a similar query in a form of a request 250 for an updated prediction of average speed 240. The road speed prediction engine 230 will determine if there has been a material change—which can be a default or defined as an attribute in generating departure alert 130 (e.g., 15 minutes, 30 minutes, 1 hour)—in the estimated total travel time for the previously approved preliminary route based on the most recent prediction of average speed 240.

Figure 3:
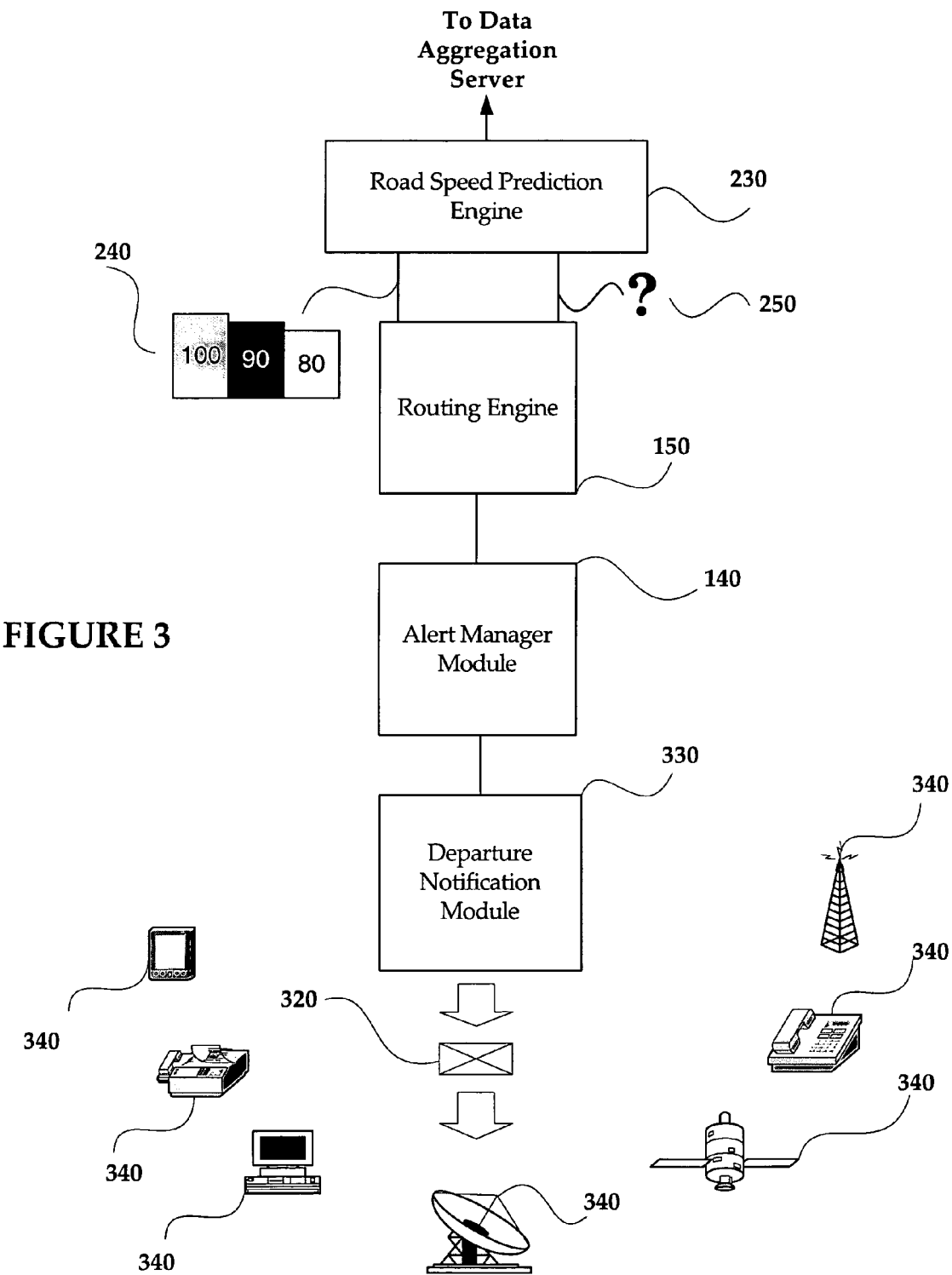
FIG. 3 shows the interaction between the data processed by the road speed prediction engine and the user information of the alert manager by the routing engine.

Referring now to FIG. 3, if there is a material change in travel time or routing as reflected by the most recent prediction of average speed 240 as generated by the road speed prediction engine 230, a departure notification 320 may be generated by the alert manager module 140, having received the updated prediction of average speed 240 via the routing engine 150, and sent to the user via a departure notification module 330.

The routing engine 150 can, through use of the most recently updated prediction of average speed 240 provided by the road speed prediction engine 230, determine a new optimal route between the departure and starting point or, if necessary, a new departure time using that same route. This new route or departure time can be included as a part of the departure notification 320 or generated in response to a subsequent query by the routing engine 150.

For example, if a user will depart from San Jose, Calif., and wishes to travel to San Francisco, Calif., on Highway 101 North and arrive at 10.00 AM, the user accesses the system through an interface providing access to the user registration server 110 (FIG. 1) and, having been authenticated as a registered user or otherwise approved to access a particular account, through the departure alert interface 120 (FIG. 1) creates a departure alert 130 (FIG. 1).

The alert manager module 140 relays the departure alert 130, along with all other alerts in the system, via the routing engine 150. The alert manager module 130 can relay departure alerts 130 individually (i.e., on an alert-by-alert basis), by user (i.e., all alerts for a particular account), or by any other means that may provide for optimal or predetermined operation of the overall system (e.g., as created, at regularly scheduled intervals, or based on particular attributes in the departure alert 130 such as longest routes, earliest arrival times, and so forth).

The routing engine 150, based on the prediction of average speed 240 provided by the road speed prediction engine 230, determines a necessary departure time from San Jose to allow for a 10:00 AM arrival in San Francisco to be 9:11 AM. This information can be conveyed to the user via the departure alert interface 120 or, dependent upon the embodiment, through any other variety of communication mediums or protocols (e.g., instant messenger, electronic mail, SMS and so forth).

Prior to departure, the routing engine 150 will continue to query the road speed prediction engine 230 in the form of the request 250 for an updated prediction of average speed 240. For example, should a major accident occur, the routing engine 150 will, in response to the request 250, be given a new and updated prediction of average speed 240 from the road speed prediction engine 230.

The road speed prediction engine 230 will have been provided with this new data (i.e., the existence of the accident) and its effect on traffic patterns (e.g., closure of a lane of traffic). This information can be provided, for example, through direct real-time traffic data (e.g., information provided by a driver at the scene of the accident via cellular phone to a traffic hotline) or extrapolation of existing data or historically observed road speed (e.g., the closure of one lane of traffic on Highway 101 for a particular 9 mile segment of roadway at 8:00 AM is generally known to reduce traffic flow by 12 miles per hour for that particular 9 mile segment of roadway).

In response to this new data, the road speed prediction engine 230 will notify the routing engine 150 of this change whereby the routing engine 150 can calculate a new route to allow for a 10:00 AM arrival in San Francisco based on a 8:15 AM departure time from San Jose (e.g., traveling on a different highway or traversing service roads for particular parts of the journey), or generate an earlier departure time (e.g., a 10:00 AM arrival will now require departure from San Jose at 8:01 AM).

Figure 4:
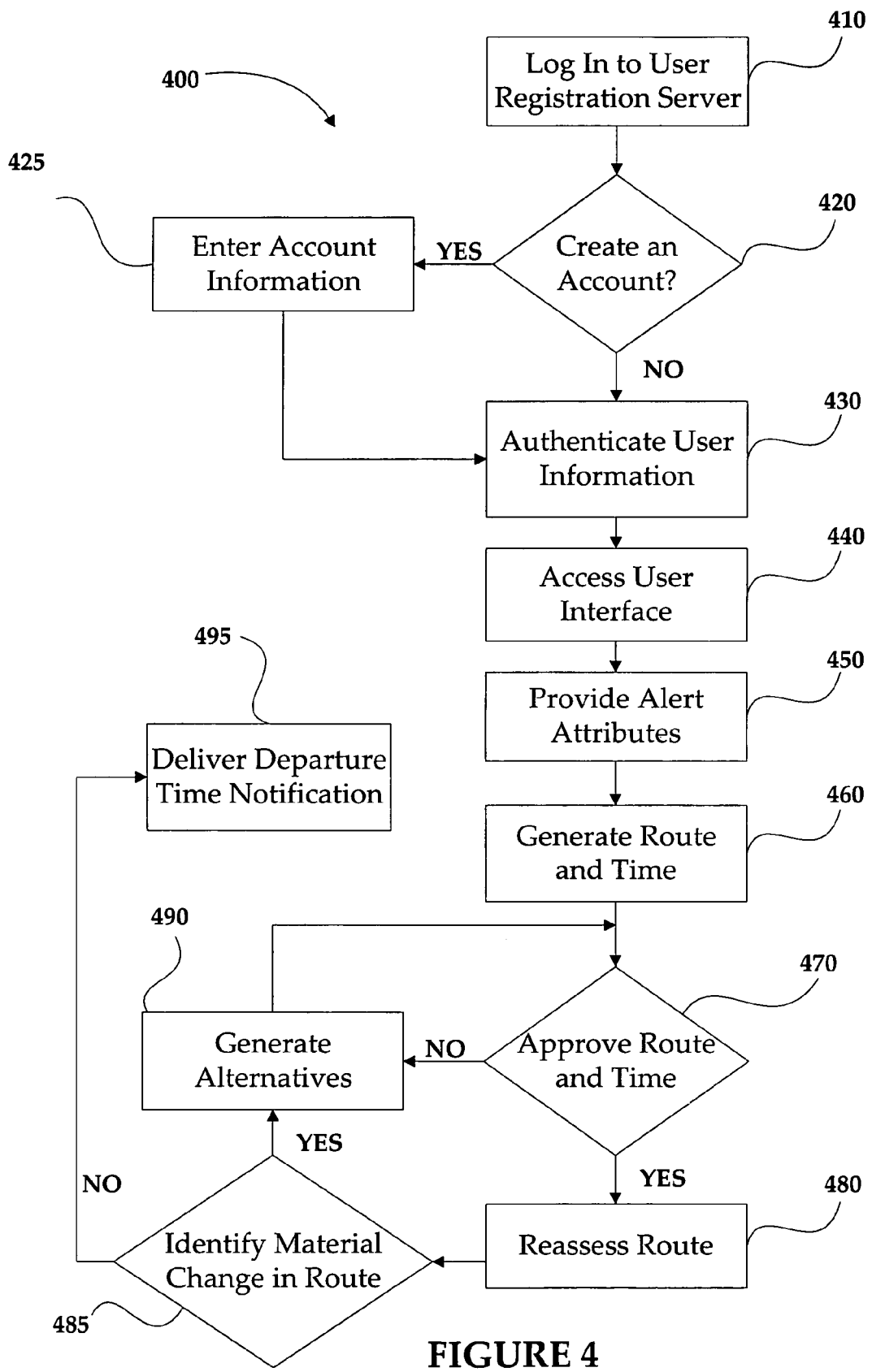
FIG. 4 shows a flowchart methodology for generating a departure alert.

FIG. 4 illustrates a flow chart 400 for generating the departure alert 130 (FIG. 1). A user will first log in 410 to the user registration server 110 (FIG. 1). If this represents a first time a user attempts to log in to the server, the user will be required to create an account 420 whereby the user registration server 110 will recognize the particular user for future interactions. If the user needs to create an account, the user will provide requisite account information 425 such as a user name, a password, and contact information such as phone, email address, or SMS address. Other information may also be provided during account information entry 425 such as credit card or billing information or particular travel information such as regular departure points or destinations.

Following the generation of an account or, if an account already exists, the user will be authenticated 430 with regard to verifying if a user is who they purport to be (e.g., by cross-referencing or validating a user name with a private password), or that the user even has a right to access the system (e.g., do they currently possess an account recognized by the system).

Following authentication 430, the user will be able to generate the departure alert 130 or to otherwise interact with the system by accessing 440 the departure alert interface 120 (FIG. 1). Through the departure alert interface 120, the user can provider certain alert attributes 450 such as origination and arrival point, desired arrival time, intricacies concerning a desired route of travel, and so forth.

In response to the provided alert attributes 450, the system will generate a preliminary route 460 and recommended departure time for traversing between the origination and arrival points. The user will then have an ability to approve or reject the route 470 based on, for example, the departure time required for traversing the route and arriving 'on-time' at the user's destination.

If the route proves to be unsatisfactory, the system will generate a 'second-best' or otherwise alternative route 490 based on known travel attributes.

If the route is satisfactory, regular queries will be made of the routing engine 150 (FIG. 1) and, in turn, the road speed prediction engine 230 (FIG. 2) in order to continually reassess 480 the approved route and determine if the previously provided departure time in conjunction with the present route will still allow for an on-time arrival.

If a material change in the previously approved route is identified 485 during one of these reassessment queries 480—a traffic incident, road closure or other event otherwise causing a material change in departure time as it relates to speed and an on-time arrival—the system will notify the user of the change and generate an alternative route and/or alternative departure time 490. The user, having been informed of the change in route and/or an alternative departure time will then have an ability to approve 470 of the new travel parameters.

If the route proves to be unsatisfactory, the system will generate a 'second-best' or otherwise alternative route based on known travel attributes.

If the alternative route or departure time is satisfactory, regular queries will again be made of the routing engine 150 and, in turn, the road speed prediction engine 230 in order to reassess 480 the approved route and determine if the previously provided departure time in conjunction with the present route will still allow for an on-time arrival. Material changes in the alternative route will be identified 485 as they are with respect to the original route and addressed as set forth above.

If there is no material change—concerning either the original route or an alternative route or departure time—then the departure notification 320 (FIG. 3) will be generated and delivered 495 to the user at a time defined by the user or through a default setting of the system via the appropriate communications medium or protocol.

Reassessment of the route 480, generation of alternative routes 490, and delivery 495 of such reassessments can occur even after the initial departure time has passed. For example, if the user is traveling a particular segment of roadway as identified by the system as being the most expedient route of travel to a desired destination and an incident occurs (e.g., a major traffic accident) whereby the particular route is no longer the most efficient route of travel or arrival time will be significantly impacted, the system can reassess the route 480 and if the incident does, in fact, represent a material change, that fact will be identified 485 whereby alternative route will be generated 490. The user can then approve or disapprove 470 of these alternative routes.

Future assessments 480 can, in turn, be made of these alternative routes and any further changes in travel time can be identified 485 resulting in a similar process of alternative travel route generation 490 and delivery 495.

Referring back to FIG. 2, FIG. 2 illustrates a portion of an exemplary system for generating departure notifications 320 (FIG. 3) whereby a data aggregation server 220 receives both real-time traffic and delayed batch traffic data sets 210 from various sources (not shown). The data aggregation server 220 manages the multiple incoming feeds of data sets 210, both real-time and delayed, and delivers these managed data sets to the road speed prediction engine 230 so that it may develop Predictions of Average Speed 240.

Data sets 210 can include what is referred to as delayed batch traffic data. This particular type of data is, generally, data that is not in real-time. While this data reflects traffic conditions on average, the data has been generated as a historical reference and may not reflect the instantaneous realities and chaos that occur in day-to-day traffic.

Data sets 210 of delayed batch traffic data can include historically observed road speeds—the average speed for a particular segment of road at a particular day and time under particular conditions—as observed by sensor loops, traffic cameras, or other means of reporting such as traffic helicopters, highway patrol reports, or drivers in traffic with cellular phones. Delayed batch traffic data sets 210 can also include weather information, incident reports (e.g., occurrence of traffic accidents and resulting road closures), information concerning traffic at particular times of year (e.g., the main access road to the beach on Labor Day), planned road construction, planned road closures, and special events such as baseball games or concerts that might otherwise affect traffic flow.

Data sets 210 can also include real-time traffic data. Real-time traffic data is data that is, generally, in real-time or generated relatively close in time after the occurrence of an incident or development of a traffic condition that the data reflects the status of traffic 'right now' or in 'real-time.' Real-time traffic data provides that information which delayed batch traffic data cannot or does not in that the data reflects the instantaneous changes that can result in a traffic commute and the chaotic intricacies that can result from, for example, 'rubber-necking' at a traffic accident or closing down three lanes on a four line highway to allow for a HAZMAT crew to arrive and clean up a chemical spill from a jackknifed tanker truck.

Real-time traffic data sets 210 can also include reports from real-time traffic sensors, helicopter traffic reports, highway patrol reports, live-news feeds, satellite data, and cellular phone calls from drivers at scene. While means for generating real-time traffic data may, in some instances, mirror those for generating delayed batch traffic data, the difference between the two types of data sets 210 lies in the historical average versus the real-time information offered by such data. Real-time traffic data sets 210 can also be generated by any number of other available manual-entry (e.g., introduction of particular traffic data into the system by a human operator at a keyboard) or automated-entry (e.g., introduction of particular traffic data into the system by another computer reviewing traffic sensors to prepare traffic reports) means.

While, in some instances, the road speed prediction engine 230 will be able to prepare a prediction of average speed 240 using only one type of data set 210—real-time traffic or delayed batch traffic data—the road speed prediction engine 230 will generally utilize both types of data sets 210 in order to generate an accurate and useful prediction of average speed 240. That is, one type of data set 210 is no more valuable, as a whole, than another and generation of the most accurate prediction of average speed 240 often requires a combination of varying data sets 210—both real-time traffic and delayed batch traffic data.

Incoming data sets 210 are collected, managed, and archived by the data aggregation server 220. The data aggregation server 220 is, largely, a database of data sets 210. Data aggregation server 220 can organize data sets 210 into various broad categories such as real-time traffic data and delayed batch traffic data. Data aggregation server 220 can also organize data sets 210 into smaller sub-categories such as sensor loop data, traffic helicopter data, or on-scene driver data. The data aggregation server 220 organizes this data in a way that allows for ease of input by the sources of various data sets 210 and ease of access by the road speed prediction engine 230. Ease of input/access can mean processing efficiency (i.e., extended searches for data need not be performed as the road speed prediction engine 230 will know exactly what part of the database to access for specific data sets 210) as well as compatibility (e.g., shared application programming interfaces (APIs) or data delivery/retrieval protocols).

The road speed prediction engine 230 will access data sets 210 managed by the data aggregation server 220 in response to a pre-programmed schedule (e.g., access the data aggregation server 220 every 5 minutes), in response to a direct request by a user or in response to a request or query by another part of the system (e.g., in response to the request 250 by routing engine 150).

The road speed prediction engine 230, through delayed batch traffic data, recognizes historical, repeating and random traffic patterns and the observable effects of those patterns as an expression of average speed for a particular segment of roadway, that is, the prediction of average speed 240.

The road speed prediction engine 230 can also take data sets 210 comprising real-time traffic data and overlay real-time traffic information with historical, repeating, and random traffic patterns and extrapolate real-time, present effects on traffic patterns, and further express average speeds for a particular segment of roadway—the prediction of average speed 240—thereby further increasing the accuracy and value of such a prediction.

For example, the road speed prediction engine 230 requests data sets 210 comprising historically observed road speed data (delayed batch traffic data) for Highway 101 North between San Jose and Palo Alto, Calif. on Monday mornings between 5:30 AM and 9:00 AM (generally peak commute and traffic time). The road speed prediction engine 230 then analyzes this data over a period of, for example, three weeks and interprets that data as an expression of average speed for that segment of roadway—the prediction of average speed 240—for future Mondays between 5:30 AM and 9:00 AM.

Thus, the data aggregation server 220 collects data sets 210 concerning road speed for the segment of roadway—Highway 101 North between San Jose and Palo Alto, Calif.—over a three-week period. The road speed prediction engine 230 accesses that data, which may be 56 mph in week one, 54 mph in week two, and 62 mph in week three. The road speed prediction engine 230, through the execution of any number of mathematical algorithms formulated to predict short-term or long-term average speeds, will recognize the average speed for that segment of roadway—the prediction of average speed 240—to be 57.3 mph on Mondays between 5:30 AM and 9:00 AM.

The road speed prediction engine 230 modifies long-term (e.g., likely average speed over the next three months) and short-term predictions (e.g., likely average speed for the next hour) of average speed for particular segments of roadways. These long- and short-term predictions are based on the aggregated data sets 210 managed by the data aggregation server 220. These predictions may change in the long-term because of, for example, road construction and known road closures. These predictions may change in the short-term because of, for example, random events such as accidents.

These modifications, too, are expressed as a part of the prediction of average speed 240. By taking into account short-term and long-term predictions, the prediction of average speed 240 for a journey in three weeks (an example of a long-term prediction) will not be skewed by the fact that a major car accident with multiple fatalities has occurred on that same segment of roadway, today, thereby resulting in multiple lane closures and an increase in travel time for the next several hours (a short-term prediction).

For example, taking the segment of roadway—Highway 101 North between San Jose and Palo Alto, Calif.—we know, from delayed batch traffic data, the average speed for that segment of roadway is 57.3 mph on Mondays between 5:30 AM and 9:00 AM. Should, for example, a traffic accident resulting in one lane closure for a distance of two miles occur at 6:00 AM, this occurrence (a part of the data set 210) will be collected by the data aggregation server 220 and eventually shared with the road speed prediction engine 230. The road speed prediction engine 230 can overlay this real-time accident and lane-closure data with the historical road speed and extrapolate the effect of the lane-closure and a new prediction of average speed 240—an average increase of 7 minutes based on the time, distance, and location of the lane-closure.

This incident, however, will not affect the prediction of average speed 240 for a trip scheduled three-weeks from now in that the road speed prediction engine 230 recognizes that the change in average speed for the next several hours is a short-term prediction. In contrast, the trip scheduled for several weeks from now is a long-term prediction wherein the traffic accident will have since been resolved and traffic patterns will return to normal.

The road speed prediction engine 230 delivers these predictions of average speed 240 to the routing engine 150. The routing engine 150 that then determines the optimal departure time and/or departure route based on information provided by the user in creating the departure alert 130 (FIG. 1).

The routing engine 150 makes a determination of departure time by evaluating the long-term and/short-term Predictions of Average Speed 240 for a particular segment or segments of roadway that comprise the route of travel between a user's point of origin and ultimate destination. After identifying the prediction of average speed 240 for a particular segment or segments of roadway, the routing engine 150, through mathematical calculation, determines the time necessary to traverse the particular road segments at that average speed. The routing engine 150, in light of the desired arrival time, then determines what time it will be necessary to depart the user's point of origin in order to arrive at the destination at the given time while traveling the known number of miles at the average prediction of speed.

For example, if the prediction of average speed 240 for a segment of roadway between the point of origin and the user's destination is 60 miles per hour and that road segment if 120 miles in length, it will take two hours traveling at the average speed to arrive at the destination from the point of origin. If the user desires to arrive at 3:00 PM, it will be necessary to depart at 1:00 PM (in order to travel the 120 mile distance at 60 miles per hour in 2 hours).

Additionally, the routing engine 150 can take into account certain attributes provided by the user during the generation of their departure alert 130 as these attributes pertain to the user's particular driving style, tendencies, or other desires and requirements.

For example, if the user still wishes to traverse the aforementioned 120 mile segment of roadway but refuses to drive at a speed above 30 miles per hour, this will obviously impact travel and arrival time despite the prediction of average speed 240. Taking into account the aforementioned prediction of average speed 240 and the user attribute limitation (i.e., a refusal to drive at more than 30 miles per hour), the routing engine 150 will now determine the travel time for that same segment of roadway to be 4 hours. If the user still wishes to arrive at 3:00 PM, it will now be necessary to departure at 11:00 AM resulting in a changed departure time to be delivered to the user.

The routing engine 150 may use a similar process to generate and, if necessary, elect an alternative route of travel to achieve an on-time arrival at the desired destination. If it becomes evident that the initial route chosen by the user will take longer to travel because of incidents or user imposed limitations (e.g., user attributes), then the routing engine 150 will recognize the imposition of an increasingly earlier departure time and seek out an alternative route of travel that, for example, is better suited to the user's driving attributes or provides a similar route of travel but with less traffic delays.

Figure 5:
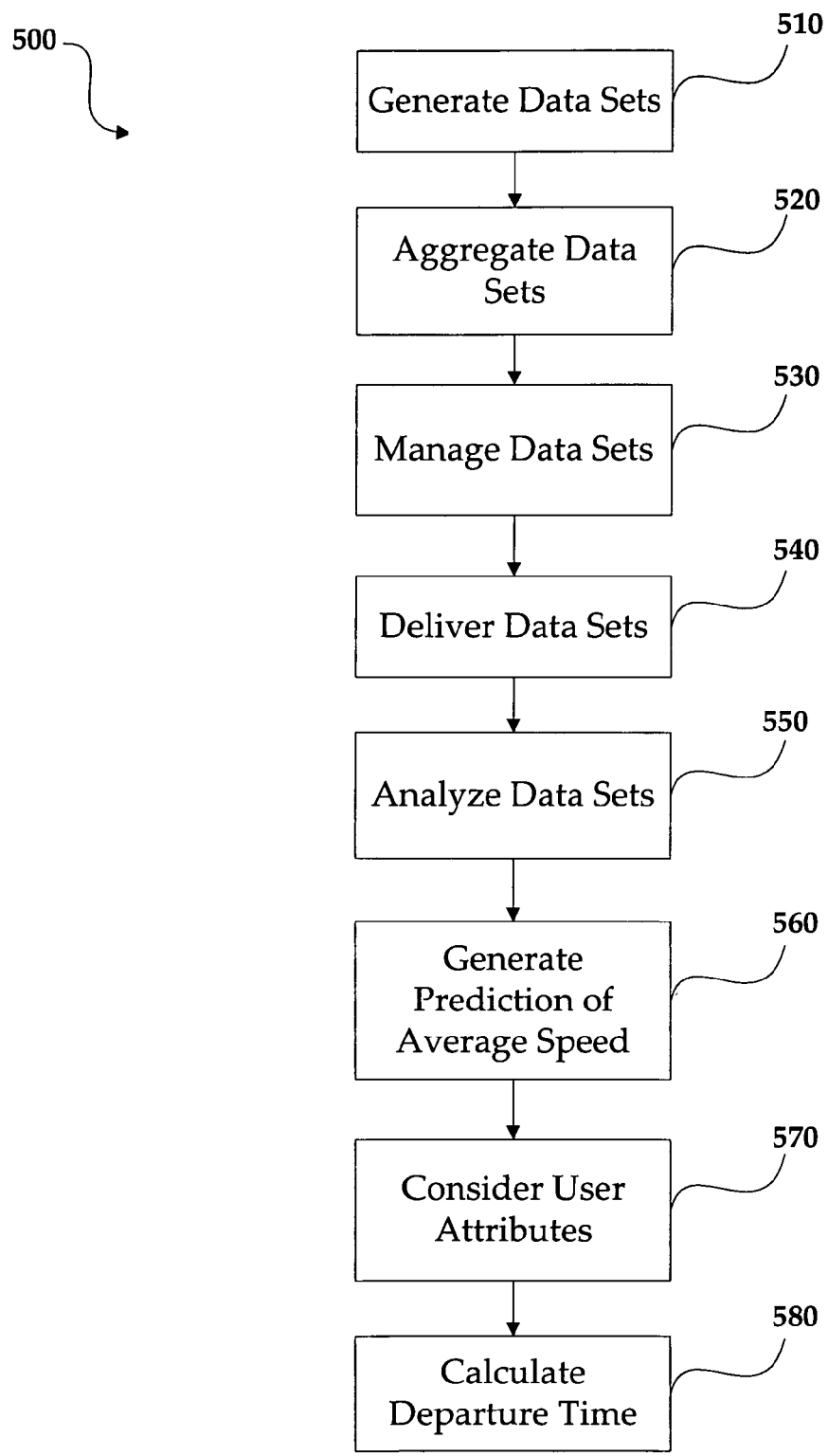
FIG. 5 shows a flowchart methodology for calculating a departure time

FIG. 5 illustrates a flow chart 500 for generating the prediction of average speed 240 (FIG. 2) wherein data sets 210 (FIG. 2) are initially generated 510 from a variety of sources such as traffic sensor loops, highway patrol traffic reports, or preexisting traffic information databases. Information can be generated automatically (e.g., by a computer) or entered manually (e.g., by a person).

Data sets 210 are then aggregated 520 by the data aggregation server 220 (FIG. 2). Aggregation of data sets 210 can occur on a regularly scheduled basis or in response to certain stimuli such as queries from other elements of the system. Aggregation 520 can also include collection of data from a database of information that is integrated into the system (e.g., memory containing traffic records and other information for particular segments of roadway for the past year). Aggregation 520 can be a result of data being 'pushed' to the data aggregation server 220 from outside sources, that is, the outside sources deliver data sets 210 to the data aggregation server 220. Aggregation 520 can also be a result of data being 'pulled' from outside sources, that is, the data aggregation server 220 specifically requests or accesses the data from the outside source.

Once data has been aggregated 520, the data aggregation server 220 will manage 530 the aggregated data sets 210. Management 530 may include categorizing certain data sets 210 as being real-time traffic data or delayed batch traffic data, or into even more specific categories such as data as it pertains to particular segments of roadway. Management 530 of traffic data can also comprise storage of specific datum to particular areas of memory to allow for quicker access and faster processing times.

Once data has been managed 530 by the data aggregation server 220, the data is then delivered 540 to the road speed prediction engine 230 (FIG. 2). Data can be delivered 540 as part of a specific request by the road speed prediction engine 230 or as a result of a routinely scheduled transfer of data. Once data has been delivered 540 to the road speed prediction engine 230, various algorithms, prediction models, or other means to generate 560 a prediction of average speed 240 (FIG. 2) are executed as a part of the analysis 550 of the received data sets 210. Data is analyzed 550 in order to calculate and generate predictions of average speed 240 for particular segments of roadway. Analysis 550 of data sets can occur through the use of publicly known algorithms and models or through proprietary formulas and models. Any means that helps generate 560 a prediction of average speed 240 may also be used.

Once the prediction of average speed 240 has been generated 560, that prediction 240 is further considered 570 in light of certain attributes provided by the user. That is, if the user has imposed certain attributes concerning desired conditions of, or limitations to, travel over a particular route, the prediction of average speed 240 may not accurately allow for calculation 580 of a departure time.

For example, if the prediction of average speed 240 for a particular sixty-mile segment of roadway is sixty miles per hour, the travel time for the segment would be one hour causing an initial calculation 580 of departure time to be one hour prior to the desired arrival time. If, for example, the user has indicated the necessity to travel no faster than thirty miles per hour due to a vehicle towing a heavy load, then travel time—regardless of the prediction of average speed 240—would increase to two hours. This increase in actual travel time would affect the calculation 580 of departure time wherein departure must now occur two hours prior to the desired arrival time due to the additional user attribute limitation.

Once all known (e.g., user attribute limitations) or expected factors (e.g., predicted road speed) have been considered, however, a departure time as it relates to desired arrival time can be calculated 580 and ultimately delivered to the user.

Referring back to FIG. 3, FIG. 3 illustrates a portion of the exemplary system for generating and delivering departure notifications 320 wherein the routing engine 150 uses the latest available prediction of average speed 240 from the road speed prediction engine 230 to determine the optimal departure time and/or route between a point of origin and a point of destination according to information and attributes received from the alert manager module 140. Delivery of departure notifications 320 can comprise the initial reporting of optimal departure time or subsequent changes in departure time due to incidents (e.g., accidents) occurring on a particular segment of roadway or, if conditions warrant, the need for a change in travel route are relayed by the routing engine 150 to the alert manager module 140.

Upon receiving information from the routing engine 150 as it pertains to route or departure time, the alert manager module 140, dependent on delivery settings and various limitations (e.g., attributes) provided by the user, will relay the departure and travel information to the departure notification module 330. The departure notification module 330 generates, manages, and provides for the delivery of departure notifications 320 to a user via a desired notification delivery protocol 340.

For example, a user can, through the departure alert interface 120 (FIG. 1), generate settings to provide for the delivery of the departure notification 320 through the desired notification delivery protocol 340. Examples of various protocols include SMS to a cellular phone, electronic mail to an electronic mail address, or via a proprietary data network to a Personal Digital Assistant (PDA) such as a Blackberry®.

In addition to delivering the departure notification 320 to a user as to the initial departure time, the departure notification module 330 can be instructed to deliver a subsequent departure notification 320 if a pre-scheduled departure time changes in excess of, for example, 10 minutes as determined by the routing engine 150 in response to predictions of average speed 240 generated by the road speed prediction engine 230.

By means of another example, the user can also create a setting whereby the user is provided with the most up-to-date departure time regardless of change, if any, 24-hours before an initially scheduled departure time. This information is delivered to the user via the departure notification 320 through the desired notification delivery protocol 340 as generated, managed, and sent by the departure notification module 330. These examples are simply illustrative and by no means limiting as to the scope of setting possibilities by the user.

For example, a user originates in San Jose, Calif. and wishes to travel to San Francisco, Calif., on Highway 101 North and arrive at 10:00 AM. The system, utilizing the various elements and processes set forth above, determines the optimal departure time to be 8:15 AM to allow for a 10:00 AM arrival. The alert manager module 140 will relay this information to the departure notification module 330. Using the desired notification time (e.g., 24 hours prior to departure) and protocol (e.g., electronic mail), the departure notification module 330 will create and deliver the departure notification 320 to the user at a pre-specified electronic mail address twenty-four hours prior to the optimal departure time.

Continuing the example, prior to departure, a major accident occurs on Highway 101 at 4:00 AM on the day of departure requiring the highway to be closed for six hours for hazardous material cleanup. Subject to data sets 210 reflecting the occurrence of this incident and as collected by the data aggregation server 220, the road speed prediction engine 230 generates a new prediction of average speed 240 reflecting slower speed and, therefore, longer travel time along this particular segment of roadway.

The routing engine 150, following the request 250, recognizes the new prediction of average speed 240 to reflect a substantial change in average speed and travel time. The routing engine 150 then determines 8:15 AM to no longer be the optimal departure time for the 10:00 AM arrival in San Francisco. The routing engine 150 recognizes that travel on Highway 101 is, in fact, impossible for the next several hours and that travel on Highway 880 North is now the optimal route with a 7:45 AM departure time due to increased traffic diverted from Highway 101 North.

The routing engine 150 relays this information to the alert manager module 140 and, the alert manager module 140, recognizing the user must arrive in San Francisco by 10:00 AM, instructs the departure notification module 330 to create and deliver the departure notification 320 to the user via the predetermined notification delivery protocol 340.

Figure 6:
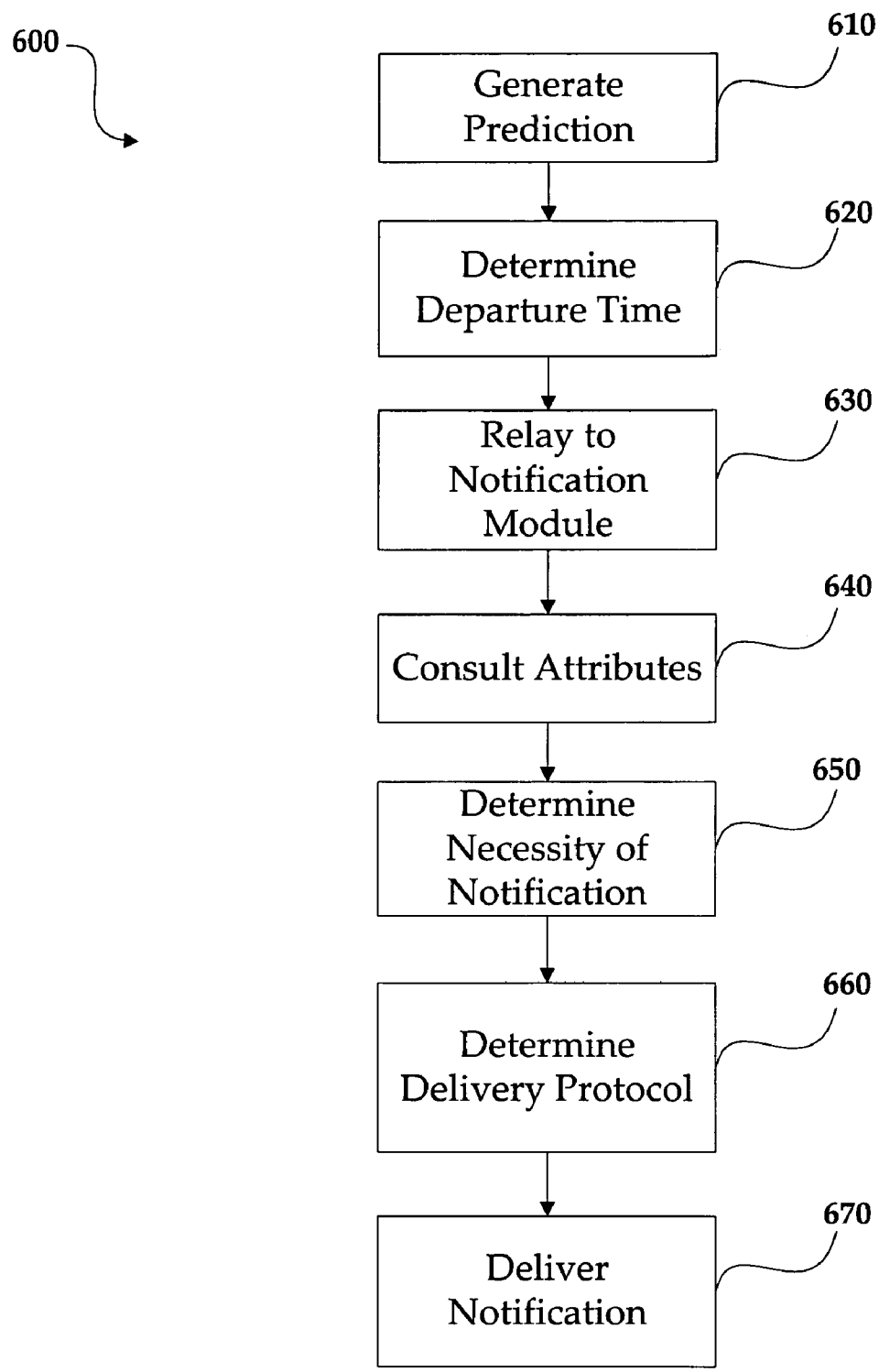
FIG. 6 shows a flowchart methodology for delivering an alert notification.

FIG. 6 illustrates a flow chart 600 for generating and delivering the departure notification 320 (FIG. 3) whereby, in accordance with user defined attributes managed by the alert manager module 140 (FIG. 1), a departure notification module 330 (FIG. 3) will generate and deliver, over a desired notification delivery protocol 340 (FIG. 3), departure notifications 320 that reflect initial or changed optimal departure times in addition to reminders of departure time and new routes of travel as current travel conditions may warrant or require.

The prediction of average speed 240 (FIG. 2) is generated 610 by the system and the routing engine 150 (FIG. 1) then makes a determination 620 of the necessary departure time in order to achieve an on-time arrival at the user's destination as identified by the user. This initial departure time and other travel information and data is then relayed 630 to the departure notification module 330.

The departure notification module 330 will also take into account 640 attributes as provided by the user such as limitations on speed or types of roads to be travel (e.g., highway v. city streets). The departure notification module 330 will then determine 650 the necessity of generating and delivering the departure notification 320. If the departure notification 320 is the initial departure notification 320 to be delivered to the user indicating the necessary departure time, this determination 650 will be in the affirmative. If the departure notification 320 is not the initial notification, determination 650 will be based on whether or not a change in travel route or travel time requires delivery of a subsequent departure notification 320. This determination 650 will, in part, be based on other attributes provided by the user such as how much of a change in travel time will warrant the delivery of the subsequent departure notification 320.

If an initial or subsequent departure notification 320 is required, the protocol to be utilized in delivering the departure notification 320 will be identified 660 (also from user identified attributes). After having determined the necessity of departure notification 320 and identification 660 of the requisite delivery protocol, the departure notification 320 will be delivered 670 to the user.

In an alternative embodiment of the present invention, the actual route embarked upon by the user can be delivered to the user in real-time whereby driving directions and/or instructions are sent to the user in a modified departure notification 320. The user receives these driving directions and/or instructions a few minutes ahead of time as to when and where the directions and/or instructions are actually needed (e.g., turn right at Fourth and Main). The modified departure notification 320 would be generated by the departure notification module 330 and based, in part, upon the prediction of average speed 240 whereby the system predicts where a user should be on the actual route based on known departure time and other known conditions affecting the prediction of average speed 240 as reflected in data sets 210.

FIG. 7 is an example of an interface 700 for generating a departure alert 130 (FIG. 1). A user may select a point of origin and destination on map 710 by positioning a cursor over the point of origin and point of destination and 'clicking' a mouse. In alternative embodiments, the point of origin and point of destination may be typed in using, for example, a keyboard. The desired arrival time may be entered through a scroll-down entry 720. In alternative embodiments, this information may also be typed in using a keyboard. Finally, a method of delivering the departure notification 320 may be indicated at e-mail entry 730. In alternative embodiments, the method of delivering the departure notification 320 could also include SMS, instant message, facsimile, telephone, and so forth.

Figure 8:
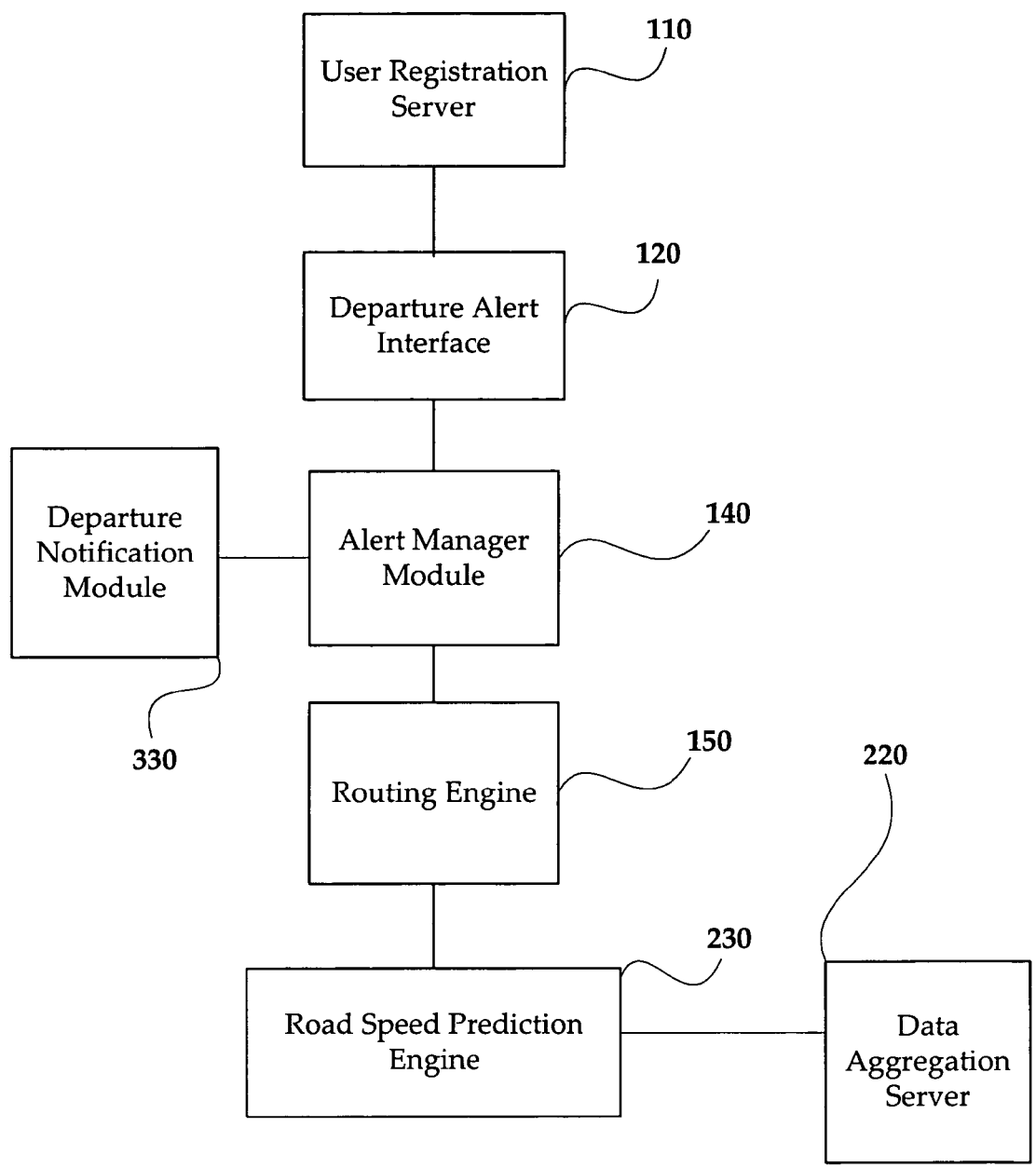
FIG. 8 shows an exemplary representation of the entire system, according to one embodiment of the present invention.

FIG. 8 shows an exemplary integration of the various elements of the system (FIGS. 1-3).

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

Notwithstanding the providing of detailed descriptions of exemplary embodiments, it is to be understood that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, method, process, or manner.

What is claimed is:

1. A system comprising:
   a data aggregation server configured to manage a plurality of data sets;
   a road speed prediction engine stored in memory and executable to generate a prediction of average speed based on the plurality of data sets, the prediction of average speed including a long-term prediction of average speed; and
   a routing engine stored in memory and executable to calculate a departure time based on at least the prediction of average speed.

2. The system of claim 1 wherein the plurality of data sets comprises at least delayed batch traffic data.

3. The system of claim 2 wherein the delayed batch traffic data comprises at least traffic data pertaining to historically observed road speeds.

4. The system of claim 2 wherein the delayed batch traffic data comprises at least traffic data pertaining to special events.

5. The system of claim 4 wherein the at least traffic data pertaining to special events comprises manual-entry data.

6. The system of claim 1 wherein the plurality of data sets comprises at least real-time traffic data.

7. The system of claim 6 wherein the real-time traffic data comprises manual- entry data.

8. The system of claim 6 wherein the real-time traffic data comprises automated-entry data.

9. The system of claim 1 wherein the prediction of average speed is generated by the road speed prediction engine through recognition of repeating traffic patterns.

10. The system of claim 1 wherein the prediction of average speed is generated by the road speed prediction engine through extrapolation from real-time traffic patterns.

11. The system of claim 1 wherein the prediction of average speed represents a short-term prediction of average speed.

12. A method comprising:
    executing instructions stored in memory to aggregate a plurality of data sets;
    executing instructions stored in memory to generate a prediction of average speed for a segment of roadway based on the plurality of data sets, the prediction of average speed including a long-term prediction of average speed; and
    executing instructions stored in memory to calculate a departure time based on at least the prediction of average speed for the segment of roadway.

13. The method of claim 12 wherein the plurality of data sets comprises at least delayed batch traffic data.

14. The method of claim 12 wherein the plurality of data sets comprises at least real-time traffic data.

15. The method of claim 13 wherein the delayed batch traffic data comprises at least traffic data pertaining to historically observed road speeds.

16. The method of claim 12 wherein the delayed batch traffic data comprises at least traffic data pertaining to special events.

17. The method of claim 13 wherein the real-time traffic data is manual-entry data.

18. The method of claim 13 wherein the real-time traffic data is automated- entry data.

19. The method of claim 11 wherein the prediction of average speed is generated by a road speed prediction engine through recognition of repeating traffic patterns.

20. The method of claim 11 wherein the prediction of average speed is generated by a road speed prediction engine through extrapolation from real-time traffic patterns.

21. The method of claim 11 wherein the prediction of average speed represents a short-term prediction of average speed.

22. A computer readable storage medium having embodied thereon a program being executable by a machine to perform a method comprising:
  aggregating a plurality of data sets;
  generating a prediction of average speed for a segment of roadway based on the plurality of data sets, the prediction of average speed including a long-term prediction of average speed; and
  calculating a departure time based on at least the prediction of average speed for the segment of roadway.

23. The computer readable storage medium of claim 22 wherein the prediction of average speed is generated through recognition of repeating traffic patterns.

24. The computer readable storage medium of claim 22 wherein the prediction of average speed is generated through extrapolation from real-time traffic patterns.

* * * * *

UNITED STATES PATENT AND TRADEMARK OFFICE
CERTIFICATE OF CORRECTION

PATENT NO. : 7,610,145 B2
APPLICATION NO. : 10/897550
DATED : October 27, 2009
INVENTOR(S) : Kantarjiev et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1404 days.

Signed and Sealed this

Twelfth Day of October, 2010

David J. Kappos
*Director of the United States Patent and Trademark Office*